United States Patent
Imanari et al.

(10) Patent No.: US 8,535,598 B2
(45) Date of Patent: Sep. 17, 2013

(54) METHOD OF FORMING HOLLOW FOAM MOLDINGS

(75) Inventors: Diasuke Imanari, Tochigi-ken (JP);
Kenichi Takase, Utsunomiya (JP);
Masayasu Okuda, Kanuma (JP);
Masato Naito, Kanuma (JP)

(73) Assignee: JSP Corporation (JP)

( * ) Notice: Subject to any disclaimer, the term of this patent is extended or adjusted under 35 U.S.C. 154(b) by 775 days.

(21) Appl. No.: 11/488,123

(22) Filed: Jul. 18, 2006

(65) Prior Publication Data
US 2007/0031622 A1 Feb. 8, 2007

(30) Foreign Application Priority Data
Aug. 4, 2005 (JP) ................................. 2005-226133

(51) Int. Cl.
*B29C 44/34* (2006.01)
*B29C 44/46* (2006.01)
*B29D 23/00* (2006.01)

(52) U.S. Cl.
USPC ............. 264/540; 264/46.1; 264/51; 428/365

(58) Field of Classification Search
USPC ....................................................... 264/46.4
See application file for complete search history.

(56) References Cited

U.S. PATENT DOCUMENTS

| | | | |
|---|---|---|---|
| 3,225,127 A * | 12/1965 | Scott, Jr. ........................ | 264/54 |
| 3,334,164 A * | 8/1967 | Samuels et. al. ............... | 264/526 |
| 3,585,262 A * | 6/1971 | Nave et al. ..................... | 264/529 |
| 4,900,504 A * | 2/1990 | Fischer ......................... | 264/529 |
| 5,116,881 A | 5/1992 | Park et al. ...................... | 521/143 |
| 5,180,751 A | 1/1993 | Park et al. ....................... | 521/51 |
| 5,616,627 A | 4/1997 | Sakurai et al. ................. | 521/134 |
| 6,077,907 A * | 6/2000 | Raetzsch et al. .............. | 525/191 |
| 6,875,484 B1 * | 4/2005 | Kogure et al. ............... | 428/34.1 |
| 7,014,801 B2 * | 3/2006 | Imanari et al. ............... | 264/45.9 |
| 2002/0043643 A1* | 4/2002 | Korehisa et al. ................ | 252/71 |
| 2003/0104197 A1* | 6/2003 | Morita et al. ............... | 428/318.6 |
| 2004/0062885 A1* | 4/2004 | Imanari et al. ............... | 428/34.1 |
| 2006/0051543 A1* | 3/2006 | Imanari et al. ............... | 428/35.7 |

FOREIGN PATENT DOCUMENTS

| | | |
|---|---|---|
| EP | 1075933 | 2/2001 |
| EP | 1403027 | 3/2004 |
| JP | 2004-359917 | 12/2004 |

OTHER PUBLICATIONS

Y.P. Khanna & K.R. Slusarz, "Dynamic Melt Rheology. II: Re-examining the Relationship of G' in Oscillatory Rheometry to the Melt Elasticity." Jan. 1993. *Polymer Engineering and Science.*

* cited by examiner

*Primary Examiner* — Benjamin Schiffman
(74) *Attorney, Agent, or Firm* — Bacon & Thomas, PLLC (57) ABSTRACT

A method for producing a hollow foam molding having a thin and uniform wall thickness, including extruding a foamable melt containing a polypropylene resin having an equilibrium compliance $J_{eo}$ of $0.5\times10^{-3}$ to $1.8\times10^{-3}$ Pa$^{-1}$ and a swell ratio $S_w$ of 2.5 or less and a physical blowing agent through a die to obtain a parison having a softened polypropylene resin foam layer, placing the parison in a mold, and blowing a gas into the parison to obtain a hollow foam molding having a hardened polypropylene resin foam layer with an apparent density of 0.35 to 0.65 g/cm$^3$.

7 Claims, 5 Drawing Sheets

METHOD OF FORMING HOLLOW FOAM MOLDINGS

CROSS-REFERENCE TO RELATED APPLICATION

This application claims, under 35 USC 119, priority of Japanese Patent Application No. 2005-226133, filed Aug. 4, 2005, disclosures of which, inclusive of the specification, claims and drawings, are hereby incorporated by reference herein.

BACKGROUND OF THE INVENTION

1. Field of the Invention

The present invention relates to a hollow foam molding having a polypropylene resin foam layer and to a blow molding method for producing such a hollow foam molding.

2. Description of Prior Art

A foam blow molding process has begun to be used in recent year for the production of hollow moldings having a foam layer. Thenceforth, various techniques have been proposed for the foam blow molding process. A typical such technique includes the steps of extruding a foamable melt containing a base resin and a blowing agent through a die to obtain a foam parison, placing the parison in a mold, and blowing a gas into the parison to blow mold the parison (International Publication No. WO99/28111 and U. S. Published Patent Application No. 2004-62885).

The hollow foam moldings obtained by such a process are light weight and excellent in heat insulation property and may be utilized for various applications such as receptacles, ducts, automobile parts and electric appliance parts. Especially, because hollow foam moldings of a polypropylene resin have excellent heat resistance and rigidity, they are expected to be utilized as air conditioner ducts for automobiles.

Conventionally, air conditioner ducts of a non-foam resin produced by blow molding have been used in automobiles. In spite of the fact that only a limited space is available in automobiles for mounting the air conditioner ducts, the automobile ducts are required to have a reduced air flow resistance in order ensure a required level of air flow capacity. Thus, air conditioner ducts must have a thin wall thickness.

No methods are currently known in the art to produce, by blow molding, a light weight air conditioner duct which is made of a polypropylene resin foam and which has a thin wall thickness. It is known to produce a hollow foam molding of a polyolefin resin foam by blow molding using a chemical blowing agent (U.S. Pat. No. 5,714,227). The molding obtained with this method, however, has an apparent density of above 0.7 g/cm$^3$ and is insufficient in lightness in weight, though the wall thickness thereof is thin. When the chemical blowing agent is used in a large amount, a hollow foam molding of a polypropylene resin foam having a good appearance and an apparent density of below 0.7 g/cm$^3$ cannot be obtained. Further, the closed cell content of such a foam molding is disadvantageously reduced.

It is also known to produce a hollow foam molding of a polypropylene resin foam by blow molding using a specific polypropylene resin having a high melt tension and a physical blowing agent such as butane (International Publication No. WO99/28111). The use of the physical blowing agent can produce a light weight hollow molding having an apparent density of 0.3 g/cm$^3$ or less. However, the wall thickness is so large that it is difficult to use the molding as an air conditioner duct for automobiles. In this case, when a die lip having a small clearance is used for producing a parison with a thin wall thickness by extrusion, corrugation unavoidably occurs so that the wall thickness of the hollow molding obtained from such a parison becomes non-uniform. With this method, therefore, it is impossible to obtain a light weight hollow foam molding having a thin wall thickness.

The known hollow foam molding of a polypropylene resin is thus either a thick-walled molding having a small apparent density or a thin-walled molding having a large apparent density. It is impossible with the known technique to produce a hollow foam molding of a polypropylene resin having a thickness of 1.0 to 5.0 mm, an apparent density of 0.35 to 0.65 g/cm$^3$ and a uniform thickness.

In the case of extrusion molding, it is possible to produce, without difficulty, a polypropylene resin foam sheet having a thickness of about 1.0 mm, as disclosed in U.S. Pat. No. 5,180,751 and Japanese Unexamined Patent Publication No. 2004-359917. Namely, such a thin foam sheet may be obtained by drawing a uniform, relatively thick extruded foam sheet while cooling during the hauling thereof rather than by using a die lip having a small clearance. The technique in the above extrusion molding cannot be applied to the blow molding, because a parison cannot be drawn in the extrusion direction beyond a certain level and because the parison must be molded in a succeeding blow molding step while it is in a softened state. Namely, it is impossible to draw a thick-walled parison into a thin-walled one.

SUMMARY OF THE INVENTION

It is, therefore, an object of the present invention to provide a blowing method for producing a light weight hollow foam molding having a thin wall with a uniform thickness.

Another object of the present invention is to provide a light weight hollow foam molding having a thin wall with a uniform thickness.

In accordance with one aspect of the present invention there is provided a method for producing a hollow foam molding having an average wall thickness of 1.0 to 5.0 mm and a thickness variation coefficient $C_v$ of 50% or less, said method comprising the steps of:

(a) extruding a foamable melt comprising a polypropylene resin and a physical blowing agent through a die to obtain a parison having a softened polypropylene resin foam layer, said polypropylene resin having an equilibrium compliance $J_{eo}$ of $0.5 \times 10^{-3}$ to $1.8 \times 10^{-3}$ Pa$^{-1}$ and a swell ratio $S_w$ of 2.5 or less;

(b) placing said parison in a mold; and (c) blowing a gas into said parison to blow mold said parison, thereby obtaining a hollow foam molding having a hardened polypropylene resin foam layer with an apparent density of 0.35 to 0.65 g/cm$^3$.

In another aspect, the present invention provides a hollow foam molding comprising a polypropylene resin foam layer, wherein said foam molding has an average wall thickness of 1.0 to 5.0 mm and a thickness variation coefficient of 50% or less, and wherein said polypropylene resin foam layer has an apparent density of 0.35 to 0.65 g/cm$^3$, an equilibrium compliance of $0.5 \times 10^{-3}$ to $1.8 \times 10^{-3}$ Pa$^{-1}$ and a swell ratio of 2.5 or less.

BRIEF DESCRIPTION OF THE DRAWINGS

Other objects, features and advantages of the present invention will become apparent from the detailed description of the invention which follows, when considered in the light of the accompanying drawings in which.

DETAILED DESCRIPTION OF THE PREFERRED EMBODIMENTS OF THE INVENTION

A blow molding method according to the present invention may be suitably carried out using any suitable known molding apparatus. An example of a blow molding apparatus is diagrammatically shown in FIG. 1. A polypropylene resin, a physical blowing agent and optionally one or more additives are kneaded in an extruder (not shown) to form a foamable melt. The foamable melt is extruded from the extruder through a die 3, generally a circular die, to a lower pressure atmosphere to obtain a foam parison 2 having a polypropylene resin foam layer 21 in a softened state. The parison 2 is placed between two halves of a blow mold 4 adapted to define a mold cavity when the two halves are closed. After or during closure of the mold, a gas such as air is blown from a gas injection pipe 5 into the parison 2 to force the parison 2 outwards to inside wall 7 of the blow mold 4 to blow mold the parison. After cooling the blow mold 4, the thus obtained hollow foam molding having the polypropylene resin foam layer 21 in a hardened state is taken out of the blow mold 4.

Figure 1:
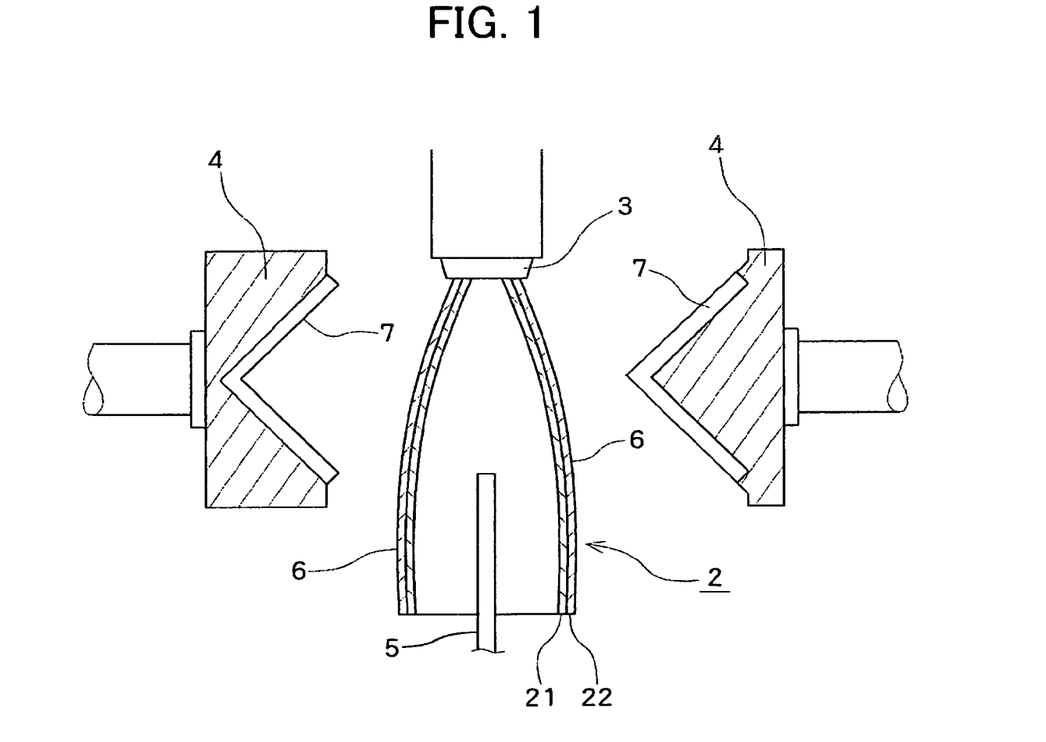
FIG. 1 is a vertical cross-sectional elevational view schematically illustrating a blow molding apparatus for carrying out a method of the present invention.

In the illustrated embodiment, the parison 2 has a two-layered structure including a non-foamed resin layer 22 laminated on the polypropylene resin foam layer 21, so that the foam molding obtained has also a two-layered structure. The resin layer 22 may be laminated by a co-extrusion method using a two layer die as the die 3. Thus, the resin is kneaded in an additional extruder and coextruded together with the above-mentioned foamable melt through the two layer die 3 to obtain the two-layered parison 2.

Figure 2A:
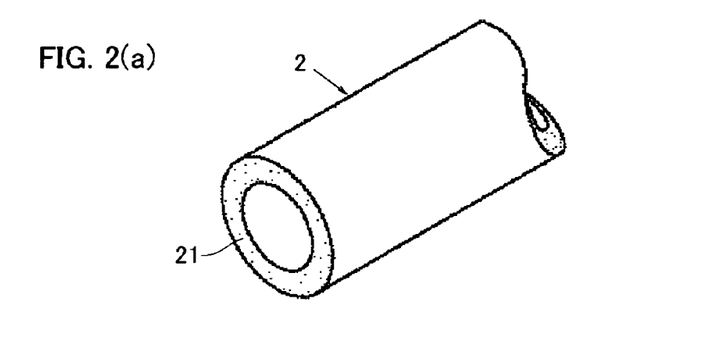
FIG. 2(a) to FIG. 2(d) are perspective views illustrating examples of tubular parisons having various wall structures.
Figure 2B:
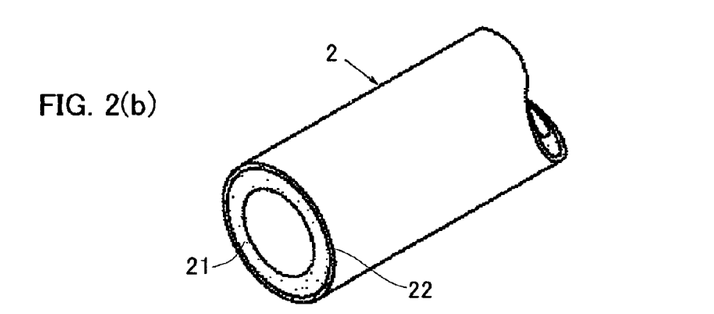
Figure 2C:
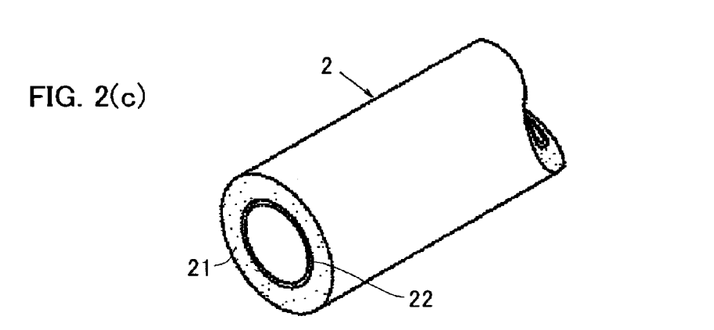
Figure 2D:
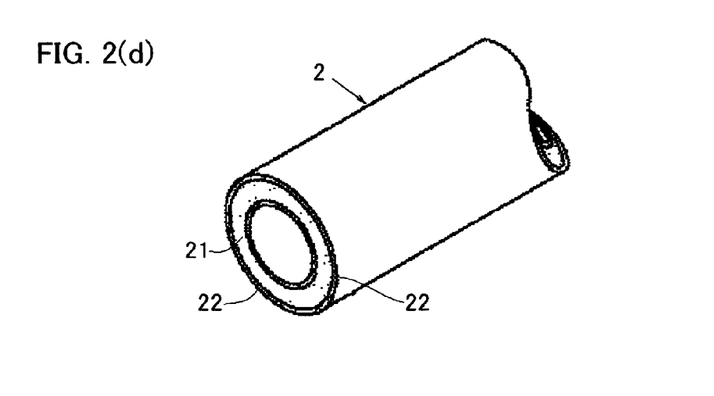

The parison 2 can be also constructed to have a single or multi-layer structure. For example, in the embodiment shown in FIG. 2(a), the parison 2 has a single layer structure of a polypropylene resin foam layer 21. In the case of a two-layer parison, the polypropylene resin foam layer 21 may be located inside of a non-foam resin layer 22 (FIG. 2(b)) or outside thereof (FIG. 2(c)). The parison 2 may also have a three layer structure in which the same or different non-foam resin layers 22 are laminated on both outside and inside of the polypropylene resin foam layer 21 (FIG. 2(d)).

Figure 7:
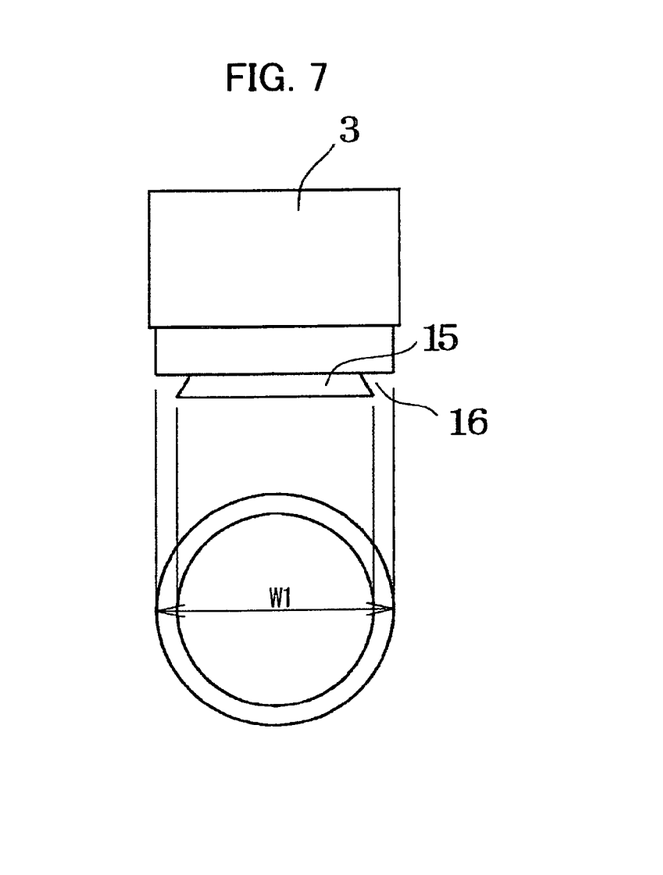
FIG. 7 shows vertical elevational and bottom views for explaining a lip diameter of a circular die.

The blow molding apparatus may be modified in various manners. For example, an accumulator (not shown) to store the melt may be suitably disposed between the die 3 and the extruder or in the die 3 to form a bigger parison. The die may have a die lip (FIG. 7) whose clearance is controlledly variable during the extrusion process. The blow mold 4 may be provided with vent holes (not shown) for the purpose of conducting the blow molding while evacuating air between the parison 2 and the inside wall 7 of the blow mold 4, so that the exterior surface 6 of the parison 2 can be closely contacted with the inside wall 7 of the blow mold 4 to give a foam molding conforming to the mold cavity and having good appearance.

Figure 3A:
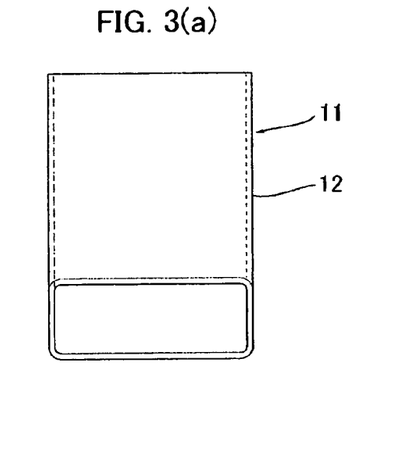
FIG. 3(a) is a vertical elevational view showing a duct of a foam molding obtainable by a method of the present invention.
Figure 3B:
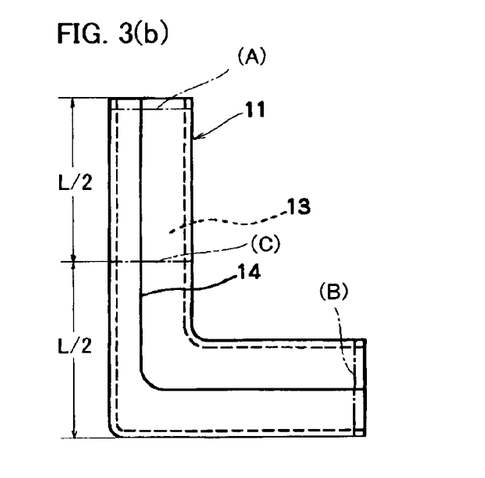
FIG. 3(b) is a side view of FIG. 3(a)
Figure 3C:
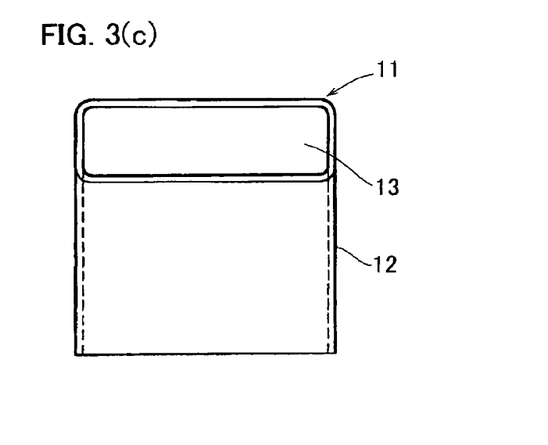
FIG. 3(c) is a top plan view of FIG. 3(a)

The hollow foam molding obtained by the method of the present invention is generally a tubular molding such as a rectangular cylinder or a circular cylinder. The tubular molding may be straight, curved or bent. Illustrated in FIG. 3(a) to FIG. 3(c) is an example of the hollow foam molding 11 which is used as a duct for air conditioners for automobiles. The molding has an L-shaped rectangular cylinder 12 defining an air flow passage 13 therein. Designated as 14 is a parting line formed where the two halves of the blow mold 4 were joined together. In the accompanying drawings, the same reference numerals designate similar component parts.

The method of the present invention is to produce a hollow foam molding having a thin, uniform wall thickness. In particular, the method is intended to provide an average wall thickness of 1.0 to 5.0 mm and a thickness variation coefficient $C_v$ of 50% or less. An average wall thickness of less than 1.0 mm is insufficient to provide sufficient mechanical strengths such as a bending strength and desired heat insulating properties. Too large an average wall thickness in excess of 5.0 mm is disadvantageous because the wall thickness tends to become non-uniform and because an air flow resistance is apt to increase when used as a duct for an automobile air conditioner. The average wall thickness is preferably 1.0 to 3.0 mm, more preferably 1.5 to 2.5 mm. When the variation coefficient $C_v$ is greater than 50%, the mechanical strengths, such as compression strength and bending strength, and heat insulating properties of the foam molding are apt to vary depending upon locations thereof. The variation coefficient $C_v$ is preferably 35% or less, more preferably 25% or less, still more preferably 15% or less.

The term "average wall thickness" of a hollow foam molding as used herein is measured by the following method. The hollow foam molding in the form of a tube is cut by a plane perpendicular to an axial direction thereof at three positions of (A) near one end thereof, (B) near the other end thereof, and (C) near the mid point between the both ends thereof. When the hollow foam molding is bent like an L-shaped molding as shown in FIG. 3(b)), the three positions (A) to (C) are as shown in FIG. 3(b). Thus, the position (C) is near the center of the longer (length: L) section thereof. Each of the three cross-sections is measured for the wall thickness at six positions which are equally spaced from each other along the perimeter thereof. The average wall thickness ($T_{av}$) is the arithmetic mean of the eighteen (18) measured thickness values ($T_1, T_2, T_3 \ldots T_{18}$).

The term "thickness variation coefficient $C_v$" as used herein is defined by the following formula:

$$C_v(\%)=(V/T_{av})\times 100$$

wherein V is a standard variation of the wall thickness and $T_{av}$ is the average wall thickness measured by the above method.

The standard variation V of the wall thickness is calculated according to the following formula:

$$V=\{\Sigma(T_i-T_{av})^2/(n-1)\}^{1/2}$$

wherein $T_i$ is a thickness value $T_1, T_2, T_3 \ldots T_{18}$ measured by the above method, $T_{av}$ is as defined above, n is the number of the measurement (namely, 18) and $\Sigma$ means a sum of $(T_i-T_{av})^2$. Thus, the above formula may be expressed as follows:

$$V=\{[(T_1-T_{av})^2+(T_2-T_{av})^2+(T_3-T_{av})^2+\ldots+(T_{18}-T_{av})^2]/17)\}^{1/2}.$$

The polypropylene resin of the polypropylene resin foam layer may be a polypropylene homopolymer or a copolymer of propylene such as a propylene-ethylene copolymer, a propylene-butene copolymer or propylene-ethylene-butene terpolymer. The polypropylene resin may additionally contain one or more polymers other than propylene homopolymer or copolymer, as long as the objects and effects of the present invention can be fulfilled.

It is important that the polypropylene resin should have an equilibrium compliance $J_{eo}$ of $0.5\times10^{-3}$ to $1.8\times10^{-3}$ $Pa^{-1}$ and a swell ratio $S_w$ of 2.5 or less in order to produce a hollow foam molding having an average wall thickness of 1.0 to 5.0 mm and a thickness variation coefficient $C_v$ of 50% or less. When a polypropylene resin having such specific equilibrium compliance $J_{eo}$ and swell ratio $S_w$ is used, a parison having a thin wall thickness can be obtained by, for example, adjusting a die lip to a small clearance while controlling the apparent density of the polypropylene foam layer to a relatively high level provided that the desired lightweight of the hollow foam molding is ensured. Further, since the parison is free of corrugations, the hollow foam molding obtained therefrom has uniform wall thickness. The die lip clearance is generally controlledly varied during the extrusion. In such a case, the die lip clearance is preferably controlled so that the maximum value of the die lip clearance (maximum die lip clearance) is between T (mm) minus 2.5 mm and T (mm) plus 1.5 mm, where T is the desired average wall thickness of the hollow foam molding.

Figure 4:
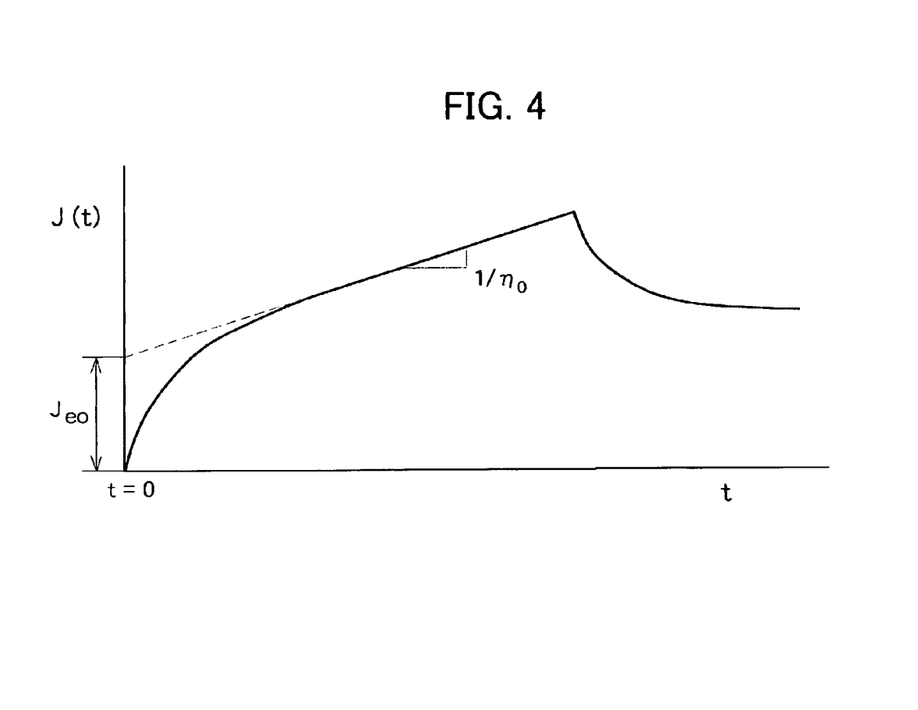
FIG. 4 is an example of a plot of creep compliance J(t) against time t used to determine equilibrium compliance $J_{eo}$ of a polypropylene resin.

The equilibrium compliance $J_{eo}$ of a polypropylene resin is known to be a measure of viscoelasticity (particularly elasticity) thereof and is influenced by degree of molecular entanglement attributed to the presence of free long branched molecular chains or ultrahigh molecular weight components. The equilibrium compliance $J_{eo}$ of a polypropylene resin can be determined by measuring the time dependency of strain $\tau(t)$ when a constant stress $\sigma_D$ is applied to the resin in a melted state sandwiched between flat plates. When the constant stress $\sigma_D$ is applied to the melted resin, the strain $\tau$ initially increases rapidly. As time lapses, however, an equilibrium is established between the time t and the strain $\tau(t)$ (namely, a linear relationship is established therebetween). A creep compliance $J(t)$ obtained by dividing the strain $\tau(t)$ by the stress $\sigma_D$ ($J(t)=\tau(t)/\sigma_D$) is plotted as ordinate against the time t as abscissa. The equilibrium compliance $J_{eo}$ is the zero time (t=0) intercept of the extrapolation of the $J(t)$ in the equilibrium state. An example of the plot of $J(t)$ against time t is shown in FIG. 4. In theory, the following relationship exists between the time t and the creep compliance $J(t)$.

$$J(t)=\tau(t)/\sigma_D=J_{eo}+t/\eta_0$$

where $\eta_0$ is a zero shear viscosity.

It is known that the larger the equilibrium compliance $J_{eo}$ of a polypropylene resin, the more preferred, since the elastic deformability thereof is improved (see U.S. Pat. No. 6,077, 878). The present inventors have found that equilibrium compliance $J_{eo}$ of a polypropylene resin can be a measure of foamability thereof and that a polypropylene resin having a large equilibrium compliance $J_{eo}$ is not suited for producing a hollow foam molding. Rather, it has been found that the equilibrium compliance $J_{eo}$ must fall within the above-mentioned specific narrow range in order to produce a parison having a thin, uniform foam layer of the polypropylene resin and, thus, to produce a hollow foam molding having a thin and uniform wall thickness.

When the equilibrium compliance $J_{eo}$ is less than $0.5\times10^{-3}$ $Pa^{-1}$, the foamability of the polypropylene resin is so low that the growth of cells is insufficient and the cell diameter becomes non-uniform. As a result, neither the mechanical strengths nor the heat insulating properties of the foam molding are satisfactory. Too high an equilibrium compliance $J_{eo}$ in excess of $1.8\times10^{-3}$ $Pa^{-1}$, on the other hand, is undesirable because, due to the excessively high foamability, a parison having a thin foam layer cannot be obtained even when the foaming temperature and kind and amount of the blowing agent are controlled. When a parison having a thin foam layer is produced from a polypropylene resin having an equilibrium compliance $J_{eo}$ greater than $1.8\times10^{-3}$ $Pa^{-1}$, the foam layer is corrugated so that the hollow foam molding obtained has not uniform wall thickness. The equilibrium compliance $J_{eo}$ is preferably $0.8\times10^{-3}$ to $1.6\times10^{-3}$ $Pa^{-1}$, more preferably $1.0\times10^{-3}$ to $1.5\times10^{-3}$ $Pa^{-1}$, still more preferably $1.2\times10^{-3}$ to $1.5\times10^{-3}$ $Pa^{-1}$.

Even when the equilibrium compliance $J_{eo}$ is within the above specific range, a parison having a thin, uniform foam layer cannot be obtained, unless the swell ratio $S_w$ of the polypropylene resin is 2.5 or less. The swell ratio $S_w$ of a polypropylene resin indicates a degree of swelling of the resin per se when extruded through a die rather than a degree of swelling due to foaming of the resin. When the swell ratio $S_w$ is greater than 2.5, a foam molding having a thin, uniform wall thickness cannot be obtained. When a parison having a thin foam layer is produced from a polypropylene resin having a swell ratio $S_w$ of greater than 2.5, the foam layer is corrugated so that the hollow foam molding obtained has not uniform wall thickness. The swell ratio $S_w$ is preferably about 1 to 2.3, more preferably 1.5 to 2.3.

In order to produce a hollow foam molding having a thin, uniform thickness, it is further important that the expansion and foaming of the parison should be controlled, by, for example, controlling the amount of the blowing agent incorporated into the foamable melt and controlling the temperature and pressure of the gas to be blown into the parison during the blow molding, so that the hollow foam molding obtained from the parison has an apparent density of 0.35 to 0.65 $g/cm^3$.

It has been hitherto considered that a desirable foam is not obtainable from a polypropylene resin having a small equilibrium compliance $J_{eo}$ and a small swell ratio $S_w$. However, when the equilibrium compliance $J_{eo}$ and swell ratio $S_w$ are relatively small values in the above-described specific ranges and when the formation of the parison and succeeding blow molding thereof are performed so as to produce a hollow foam molding having an apparent density of 0.35 to 0.65 $g/cm^3$, a parison having a thin, uniform wall thickness can be obtained by controlling the clearance of the die lip, probably because excessive inflation of the extruded resin by swelling of the resin per se as well as by foaming of the resin can be suppressed.

The equilibrium compliance $J_{eo}$ herein is as measured using a dynamic viscoelasticity measuring machine (Dynamic Analyzer Model SR200 manufactured by Rheometrics Scientific F. E. Ltd.). A polypropylene resin is compression molded at 260° C. under a pressure of 8,000 kPa for 5 minutes using a heat press to obtain a resin plate with a thickness of 2 mm. A disc sample with a diameter of 25 mm is cut out from the plate and sandwiched between a pair of parallel plates (diameter: 25 mm) of the dynamic viscoelasticity measuring machine. The assembly is then heated to 210° C. and allowed to stand for about 10 minutes in a nitrogen atmosphere. Then, the gap between the parallel plates is reduced to 1.4 mm and the leaked molten resin is removed. Then, a constant stress $\sigma_D$ is applied to the sample by rotating the upper plate and the change of strain $\tau(t)$ with time is measured. The zero time (t=0) is the time point at which the application of the constant stress has started. Dynamic Analyzer Model SR200 is operated under the conditions shown Table 1 and is adapted to automatically calculate the equilibrium compliance $J_{eo}$.

TABLE 1

TEST PARAMETERS:

| | |
|---|---|
| Save Geometry As | |
| Geometry Type | Parallel plates (ParaPlate) |
| Diameter | 25.0 [mm] |
| Gap | 1.4 [mm] |
| Tool Inertia | 376.6 [gm° cm>>] |
| Test Type | Step Stress(Creep) (StpStress) |
| Save Setup As | |
| Temperature | 210.0[1/2C.] |
| Sampling Mode | Linear |
| Points Per Zone | 200[] |
| Stress | 1000.0, 0.0, 0.0, 0.0, 0.0, 0.0, 0.0, 0.0[dynes/cm>>] |
| Zone Time | 5:00, 16:40, 0, 0, 0, 0, 0, 0[s or h:m:s] |
| PreShear Mode | Preshear Off |
| Delay Before Test | On |
| Delay Before Test | 20:00[s or h:m:s] |
| Analog Data Collection | Off |
| Automatic Steady State | Disabled |
| Acceptance Window | 1.0[%] |
| Strain Limit: End Zone | When Allowed Strain is Exceeded Off |
| Maximum Allowed Strain | 100.0[%] |
| Turn Off Motor | No |
| Turn Hold On | No |
| Turn Off Temp Controller | No |
| Set End of Test Temp | No |
| END TEST PARAMETERS | |

The swell ratio $S_w$ is as measured using Melt Tension Tester Model II (manufactured by Toyo Seiki Seisaku-Sho Ltd.). A polypropylene resin is extruded through a cylindrical orifice having an orifice diameter of 2.095 mm and a length of 8 mm at a resin temperature of 210° C. and a piston speed of 10 mm/minute to obtain an extrudate in the form of a string. The diameter of the string at a position 10 mm below the lower end of the orifice is measured. In that position, swell occurs due to elastic recovery of the resin. The swell ratio $S_w$ is given as a ratio of the measured diameter to the orifice diameter.

Polypropylenes having an equilibrium compliance $J_{eo}$ of $0.5 \times 10^{-3}$ to $1.8 \times 10^{-3}$ Pa$^{-1}$ and a swell ratio $S_w$ of 2.5 or less may be best suitably used, either singly or as a mixture thereof, as the polypropylene resin having an equilibrium compliance $J_{eo}$ of $0.5 \times 10^{-3}$ to $1.8 \times 10^{-3}$ Pa$^{-1}$ and a swell ratio $S_w$ of 2.5 or less. Alternatively, two or more polypropylenes whose equilibrium compliance $J_{eo}$ and/or swell ratio $S_w$ are outside the required ranges may be blended so that the blend has an equilibrium compliance $J_{eo}$ of $0.5 \times 10^{-3}$ to $1.8 \times 10^{-3}$ Pa$^{-1}$ and a swell ratio $S_w$ of 2.5 or less. Such a blend is also used as the polypropylene resin for the purpose of the present invention.

Polypropylenes having an equilibrium compliance $J_{eo}$ of $0.5 \times 10^{-3}$ to $1.8 \times 10^{-3}$ Pa$^{-1}$ and a swell ratio $S_w$ of 2.5 or less may be high melt tension polypropylenes which have long, branched chains or which contain ultrahigh molecular weight components. Examples of the polypropylene having an equilibrium compliance $J_{eo}$ of $0.5 \times 10^{-3}$ to $1.8 \times 10^{-3}$ Pa$^{-1}$ and a swell ratio $S_w$ of 2.5 or less include a recycled product from high melt tension polypropylene PF814 (homopolypropylene; product of SunAllomer Ltd.) and a recycled product from high melt tension polypropylene SD632 (ethylene-propylene block copolymer; product of SunAllomer Ltd.). Examples of the blend of polypropylenes which has an equilibrium compliance $J_{eo}$ of $0.5 \times 10^{-3}$ to $1.8 \times 10^{-3}$ Pa$^{-1}$ and a swell ratio $S_w$ of 2.5 or less include a blend of high melt tension polypropylene PF814 (homopolypropylene; product of SunAllomer Ltd.) with an ordinary polypropylene having equilibrium compliance $J_{eo}$ and/or swell ratio $S_w$ which are outside the required ranges, and a blend of high melt tension polypropylene SD632 (ethylene-propylene block copolymer; product of SunAllomer Ltd.) with an ordinary polypropylene having equilibrium compliance $J_{eo}$ and/or swell ratio $S_w$ which are outside the required ranges.

The polypropylene resin may contain an additional resin other than the propylene-based resin as long as the additional resin-containing polypropylene resin has an equilibrium compliance $J_{eo}$ of $0.5 \times 10^{-3}$ to $1.8 \times 10^{-3}$ Pa$^{-1}$ and a swell ratio $S_w$ of 2.5 or less. Examples of the additional resin include polyethylene resins such as a high density polyethylene resin, a low density polyethylene resin and a linear low density polyethylene; thermoplastic elastomer such as a styrene-butadiene-styrene block copolymer; ethylene-propylene rubbers; and polystyrene resins.

The polypropylene resin of the polypropylene resin foam layer preferably has a melt flow rate of 3 to 20 g/10 min, because of proper balance between good moldability of the foam parison and physical properties of the hollow foam molding. The melt flow rate herein is a melt mass flow rate as measured in accordance with JIS K 7210(1999), Test Method A at a temperature of 230° C. and a load of 2.16 kg.

As described previously, the parison may be a multi-layer parison having a non-foamed resin layer laminated on one or both sides of the polypropylene resin foam layer. A hollow foam molding obtained from such a parison has improved strengths and good appearance. Further, it is easy to impart desired property, such as antibacterial property or deodorizing property, to the foam molding by using a non-foamed resin layer made of a functional resin having such a property.

The thickness of the non-foamed resin layer of the foam molding is preferably 0.1 to 1.5 mm, more preferably 0.5 to 1.0 mm. Thus, the thickness of the non-foamed resin layer of the parison is preferably 0.5 to 2.5 mm, more preferably 1.0 to 2.0 mm.

The non-foamed resin layer may be formed of a resin which is used to form the polypropylene resin foam layer. Thus, a propylene-based resin, a polyethylene resin, a polystyrene resin or a mixture thereof may be used. Any other suitable resins such as a polyester resin, a polyamide resin, a polycarbonate resin may also be used, if desired. Further, a thermoplastic elastomer or rubber may be incorporated into the non-foamed resin layer. To improve adhesion between the polypropylene resin foam layer and the non-foamed resin layer, an intermediate layer or an adhesive layer which has good affinity with the two layers may be interposed therebetween.

In the method of the present invention, the polypropylene resin is heated and kneaded in an extruder, with which a physical blowing agent is mixed under a pressure and kneaded to form a foamable melt. The melt is extruded from the extruder through a die to obtain a parison having a softened polypropylene resin foam layer. As described previously, the formation of the parison and the succeeding blow molding thereof should be performed in such a way that a hollow foam molding obtained has a hardened polypropylene resin foam layer with an apparent density of 0.35 to 0.65 g/cm$^3$.

When the parison is formed such that the apparent density of the foam layer of the hollow foam molding obtained therefrom is less than 0.35 g/cm$^3$, it is impossible to simultaneously attain the desired thin wall thickness and the thickness variation coefficient $C_v$. Further, the mechanical strengths such as bending strength and compressive strength of the foam molding tend to be reduced. When the parison is formed so that the apparent density of the foam layer of the hollow foam molding obtained therefrom is greater than 0.65 g/cm$^3$, the lightweight property and heat insulating property of the foam molding are adversely affected. The apparent density of the polypropylene resin foam layer of the hollow foam molding is preferably 0.35 to 0.5 g/cm$^3$, more preferably 0.35 to 0.45 g/cm$^3$, still more preferably 0.4 to 0.45 g/cm$^3$. Incidentally, the apparent density of a hollow foam molding generally depends upon the apparent density of a foam parison from which the foam molding is produced. The apparent density of the foam parison may be controlled by controlling the amount of a blowing agent which will be described hereinafter. In actual, however, it is not possible to measure the apparent density of the foam parison which is in a softened state. In the present invention, the apparent density of the hollow foam molding can be adjusted to a desired value by previously determining the change of the apparent density of the foam molding as a function of the amount of the blowing agent used.

As used herein, the "apparent density of the polypropylene resin foam layer" is as measured by the following method. Samples are cut out from the molding in each of three positions of (A) near one end thereof, (B) near the other end thereof, and (C) near the mid point between the both ends thereof, three. When the hollow foam molding is a bent molding such as an L-shaped molding as shown in FIG. 3(b)), the three positions (A) to (C) are as shown in FIG. 3(b). Thus, the position (C) is near the center of the longer (length: L) section thereof. In each of the three positions (A), (B) and (C), samples are cut out at three circumferentially equally spaced apart locations, there by obtaining nine (9) samples in total. The weight and volume of each sample are measured. The apparent density is calculated by dividing the volume of the sample by the weight thereof. The apparent density of the polypropylene resin foam layer is an arithmetic mean of the calculated values of the nine samples. When the hollow foam molding is has a multi-layered structure, the non-foamed resin layer is peeled away from the sample and only the polypropylene resin foam layer is used for the measurement of the apparent density thereof.

A physical blowing agent is used for forming the polypropylene resin foam layer. Examples of the physical foaming agent include aliphatic hydrocarbons such as propane, n-butane, isobutane, cyclobutane, n-pentane, isopentane, cyclopentane, n-hexane, isohexane and cyclohexane; halogenated hydrocarbons such as methyl chloride, ethyl chloride, 1,1,1,2-tetrafluoroethane and 1,1-difluoroethane; alcohols such as ethanol and methanol; ethers such as dimethyl ether, diethyl ether and methyl ethyl ether; inorganic physical blowing agents such as carbon dioxide, nitrogen and water. These physical blowing agents may used singly or in combination of two or more thereof. If desired, the physical blowing agent may be used together with a chemical blowing agent such as azodicarbonamide.

It is particularly preferred that a physical blowing agent contain 50 to 100 mol % of carbon dioxide because of reduced cycle time required for completing one molding cycle, improved dimensional stability of the foam molding and easiness in providing a thin wall thickness. The amount of the physical blowing agent is suitably determined in consideration of the desired apparent density (expansion ratio) of the foam molding. Generally, the physical blowing agent is used in an amount of 0.01 to 1.2 mols per 1 kg of the polypropylene resin.

A cell controlling agent such as talc or a metal stearate may be incorporated into the foamable melt containing the polypropylene resin and blowing agent. The cell controlling agent is generally used in the form of a master batch as a mixture with a resin such as the above-described polypropylene resin or a polyethylene resin. The cell controlling agent is used in an amount of 0.05 to 10 parts by weight per 100 parts by weight of the polypropylene resin.

One or more other additives such as a flame retardant, a fluidity improver, a UV absorbing agent, an electrical conductivity imparting agent, an antistatic agent, a colorant, a thermal stabilizer, an antioxidant and an inorganic filler may also incorporated into the foamable melt, if desired. When the hollow foam molding has one or more non-foamed resin layers, these additives may also be incorporated thereinto, if desired.

As described previously with reference to FIG. 1, the parison 2 having a polypropylene resin foam layer 21 in a softened state is placed between two halves of a blow mold 4 and is molded after closure of the mold halves. It is preferred that, before closure of the mold halves, a gas be blown from the gas injection pipe through the parison to widen the parison such that the maximum width of the widened parison in the direction perpendicular to the extrusion direction is 0.7 to 1.5 times, preferably 0.8 to 1.5 times, more preferably 0.85 to 1.3 times, the maximum width of the aimed hollow foam molding in the direction perpendicular to the extrusion direction. By the widening of the parison, an excessive stretching of the parison or an excessive increase in radius of curvature of the parison relative to that of the mold cavity during the succeeding molding step can be prevented and, hence, variation of the wall thickness of the hollow foam molding can be prevented. Namely, the widening of the parison can improve the uniformity of the wall thickness of the hollow foam molding. In this case, the parison may be pinched at its lower portion to facilitate the widening operation.

It is particularly preferred that, before closure of the mold halves, the parison be stretched in a suitable draw ratio in the extrusion direction by clamping a lower open end thereof while blowing air thereinto for the widening thereof in a manner as described above. By the stretching and widening of the parison, the uniformity of the wall thickness of the hollow foam molding in the extrusion direction can be further improved.

Figure 5:
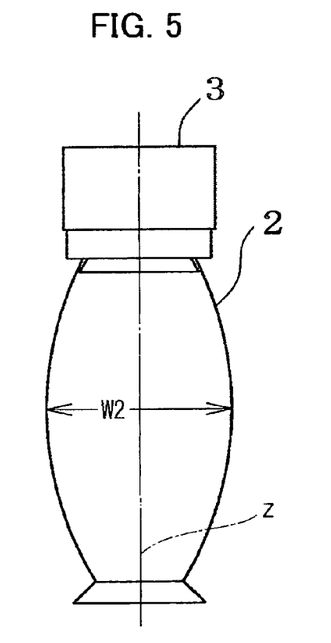
FIG. 5 is a vertical elevational view schematically illustrating a tubular parison for explaining its maximum width.
Figure 6A:
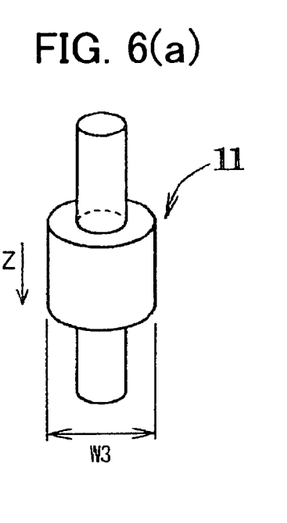
FIG. 6(a) is a perspective view schematically illustrating an example of a hollow foam molding for explaining its maximum width.
Figure 6B:
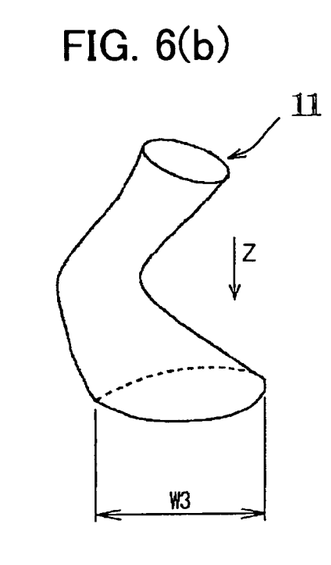
FIG. 6(b) a perspective view schematically illustrating another example of a hollow foam molding for explaining its maximum width.

The term "maximum width" of the widened parison in the direction perpendicular to the extrusion direction is intended to refer to the maximum diameter W2 (see FIG. 5) of the widened parison 2 in the direction perpendicular to the direction Z in which the parison 2 is extruded from the die 3. The term "maximum width" of the hollow foam molding in the direction perpendicular to the extrusion direction is intended to refer to the maximum distance W3 (see FIGS. 6(a) and 6(b)) of the hollow foam molding 11 in the direction perpendicular to the extrusion direction Z. The maximum distance W3 is generally the same as the maximum distance of the mold cavity (defined by the closed two halves of the blow mold 4) in the direction perpendicular to the feed direction of the parison into the blow mold 4.

It is preferred that the die 3 used to form a tubular parison 2 is a circular die having a lip diameter which is 0.2 to 0.5 time, more preferably 0.3 to 0.45 time, the maximum width of the aimed hollow foam molding in the direction perpendicular to the extrusion direction. The term "lip diameter" of the circular die is intended to refer to a diameter W1 (see FIG. 7) of the die lip 16 defined about a die core 15.

After the parison has been placed in position between the opened mold halves, the mold halves are closed. The closure of the mold halves is preferably conducted in the state where the maximum pressure inside the parison is 0.01 to 0.40 MPa(G), more preferably 0.03 to 0.30 MPa(G), still more preferably 0.15 to 0.30 MPa(G), for reasons of improved uniformity of the wall thickness of the hollow foam molding. The pressure inside the parison can be controlled by adjusting the pressure of a gas to be blown into the parison and can be measured by a pressure gauge attached to, for example, a gas injection nozzle.

The closure of the mold causes the parison to be blow molded. After the closure of the mold, the pressure inside the parison may be further increased to 0.05 to 0.50 MPa(G), preferably 0.20 to 0.40 MPa(G). After the completion of the blow molding, the blow mold is cooled to take the hollow foam molding having a polypropylene resin foam layer in a hardened state out of the blow mold. The foam molding thus obtained has no openings except the hole through which the air injection pipe extended thereinto. To obtain final product, such as a duct shown in FIG. 3, the foam molding is cut at suitable positions to form end openings.

The polypropylene resin foam layer of the hollow foam molding preferably has an equilibrium compliance of $0.5 \times 10^{-3}$ to $1.8 \times 10^{-3}$ $Pa^{-1}$ and a swell ratio of 2.5 or less. The equilibrium compliance $J_{eo}$ is preferably $0.8 \times 10^{-3}$ to $1.5 \times 10^{-3}$ $Pa^{-1}$, more preferably $1.0 \times 10^{-3}$ to $1.5 \times 10^{-3}$ $Pa^{-1}$. The swell ratio $S_w$ is preferably about 1 to 2.3, more preferably 1.4 to 2.1. The equilibrium compliance and swell ratio of the polypropylene resin foam layer may be measured in the same manner as described previously with regard to the measurement of equilibrium compliance $J_{eo}$ and swell ratio $S_w$ of the polypropylene resin except that the test sample is obtained by heating and pressing the polypropylene foam layer to completely collapse the foam cells thereof.

The foam molding which is lightweight and has thin uniform wall thickness may be suitably used for various applications such as receptacles, ducts, automobile parts and electric appliance parts.

The following examples and comparative examples will further illustrate the present invention.

Polypropylenes A, B and C used in the examples and comparative examples are as follows:

Polypropylene A: propylene homopolymer PF814 manufactured by SunAllomer Ltd.; density: 0.900 $g/cm^3$; equilibrium compliance $J_{eo}$ of $2.52 \times 10^{-3}$ $Pa^{-1}$; swell ratio $S_w$: 3.0; MFR: 3.0 g/10 min Polypropylene B: recycled product from propylene homopolymer PF814; density: 0.900 $g/cm^3$; equilibrium compliance $J_{eo}$ of $1.35 \times 10^{-3}$ $Pa^{-1}$; swell ratio $S_w$: 1.8; MFR: 7.0 g/10 min Polypropylene C: propylene homopolymer PRIMEPOLYPRO J-700GP manufactured by Prime Polymer Co., Ltd.; density: 0.900 $g/cm^3$; equilibrium compliance $J_{eo}$ of $0.36 \times 10^{-3}$ $Pa^{-1}$; swell ratio $S_w$: 1.4; MFR: 9.0 g/10 min.

EXAMPLE 1

A hollow foam molding having a maximum width of 180 mm in the direction perpendicular to the extrusion direction was produced using a mixture of Polypropylene A and Polypropylene B (mixing weight ratio A/B was 20:80 as shown in Table 2) as a polypropylene resin. The equilibrium compliance $J_{eo}$ and swell ratio $S_w$ of the polypropylene resin were as shown in Table 2. A foamable melt containing the polypropylene resin, carbon dioxide gas as a blowing agent in an amount as shown Table 2 and a master batch of a cell controlling agent in an amount of 3 parts by weight per 100 parts by weight of the polypropylene resin was extruded from an extruder through a circular die (having a die lip diameter and a maximum die lip clearance shown in Table 2) having a ratio of the die lip diameter to the maximum width of the intended foam molding of 0.44 to obtain a parison. The master batch was composed of 85% by weight of low-density polyethylene, 5% by weight of sodium stearate and 10% by weight of talc. The maximum die lip clearance is the maximum value of the die lip clearance as described previously. Air was blown into the parison so that the parison was widened to have a maximum width and a widening ratio (the ratio of the maximum width of the parison to the maximum width of the hollow foam molding) as shown in Table 3. The parison was then placed between two molds, and the molds were closed. In this case, the maximum pressure inside the parison was as shown in Table 3. Then, pressurized air having the pressure shown in Table 3 was blown into the parison to blow mold the parison. After cooling, a hollow foam molding thus obtained was taken out of the mold. The apparent density, average thickness, difference R between the maximum thickness and the minimum thickness, standard variation V of the thickness and thickness variation coefficient $C_v$ of the hollow foam molding were as shown in Table 3.

The foam molding was also measured for its equilibrium compliance and swell ratio. The equilibrium compliance and swell ratio of the foam molding are shown in Table 4. It was found that the equilibrium compliance and swell ratio of the foam molding were almost the same as those of the polypropylene resin used as the raw material.

EXAMPLES 2-6 AND COMPARATIVE EXAMPLES 1-5

Hollow foam moldings each having a maximum width of 180 mm were produced in the same manner as described in Example 1 except that at least some of the polypropylene resins, extrusion conditions, parison widening conditions and blow molding conditions were changed as shown in Table 2 and Table 3. The apparent density, average thickness, difference R between the maximum thickness and the minimum thickness, standard variation V of the thickness and thickness variation coefficient $C_v$ of the hollow foam molding are shown in Table 3. The equilibrium compliance and swell ratio of the foam molding are shown in Table 4. It was found that the equilibrium compliance and swell ratio of each of the foam moldings were almost the same as those of the corresponding polypropylene resin used as the raw material.

TABLE 2

|  | Polypropylene Resin | | | Amount of $CO_2$ (mol/kg) | Die Lip Diameter (mm) | Maximum Die Lip Clearance (mm) |
| --- | --- | --- | --- | --- | --- | --- |
|  | Polypropylene; weight ratio | $J_{eo}$ ($\times 10^{-3}$ $Pa^{-1}$) | Swell Ratio $S_w$ | | | |
| Example 1 | A/B = 20/80 | 1.56 | 2.3 | 0.15 | 80 | 1.5 |
| Example 2 | A/B = 20/80 | 1.56 | 2.3 | 0.18 | 70 | 2.0 |
| Example 3 | B = 100 | 1.35 | 1.8 | 0.15 | 80 | 1.5 |
| Example 4 | B = 100 | 1.35 | 1.8 | 0.08 | 90 | 1.5 |

TABLE 2-continued

| | Polypropylene Resin | | Swell Ratio $S_w$ | Amount of $CO_2$ (mol/kg) | Die Lip Diameter (mm) | Maximum Die Lip Clearance (mm) |
|---|---|---|---|---|---|---|
| | Polypropylene; weight ratio | $J_{eo}$ (×10⁻³ Pa⁻¹) | | | | |
| Example 5 | A/C = 30/70 | 1.10 | 1.7 | 0.15 | 80 | 1.5 |
| Example 6 | B/C = 60/40 | 0.95 | 1.6 | 0.15 | 80 | 1.5 |
| Comp. Ex. 1 | A = 100 | 2.52 | 3.0 | 0.15 | 80 | 1.5 |
| Comp. Ex. 2 | A = 100 | 2.52 | 3.0 | 0.15 | 80 | 0.5 |
| Comp. Ex. 3 | A/B = 70/30 | 1.78 | 2.9 | 0.15 | 80 | 1.5 |
| Comp. Ex. 4 | A/B = 20/80 | 1.56 | 2.3 | 0.25 | 70 | 1.5 |
| Comp. Ex. 5 | C = 100 | 0.36 | 1.4 | 0.08 | 90 | 1.0 |

TABLE 3

| | Foam Parison | | | Hollow Foam Molding | | | | | | |
|---|---|---|---|---|---|---|---|---|---|---|
| | Maximum Inside Pressure (MPa(G)) | Maximum Width (mm) | Widening ratio | Air Pressure for Blow Molding (MPa(G)) | Maximum Width (mm) | Apparent Density of Foam Layer (g/cm³) | Wall Thickness | | | |
| | | | | | | | Average Thickness (mm) | Difference R (mm) | Standard Variation V (mm) | Variation Coefficient $C_v$ (%) |
| Example 1 | 0.25 | 230 | 1.28 | 0.28 | 180 | 0.39 | 2.1 | 2.0 | 0.25 | 11.9 |
| Example 2 | 0.27 | 230 | 1.28 | 0.30 | 180 | 0.35 | 3.2 | 2.8 | 0.39 | 12.2 |
| Example 3 | 0.25 | 220 | 1.22 | 0.28 | 180 | 0.41 | 1.9 | 2.2 | 0.23 | 12.1 |
| Example 4 | 0.28 | 200 | 1.11 | 0.32 | 180 | 0.49 | 1.2 | 1.2 | 0.14 | 11.7 |
| Example 5 | 0.25 | 220 | 1.22 | 0.28 | 180 | 0.41 | 1.9 | 2.3 | 0.26 | 13.7 |
| Example 6 | 0.25 | 210 | 1.17 | 0.28 | 180 | 0.43 | 1.8 | 2.5 | 0.25 | 13.9 |
| Comp. Ex. 1 | 0.25 | 250 | 1.39 | 0.28 | 180 | 0.32 | 3.8 | 4.5 | 1.98 | 52.1 |
| Comp. Ex. 2 | 0.30 | 270 | 1.50 | 0.33 | 180 | 0.29 | 1.4 | 5.8 | 0.88 | 62.9 |
| Comp. Ex. 3 | 0.25 | 240 | 1.33 | 0.28 | 180 | 0.33 | 3.3 | 4.0 | 1.71 | 51.8 |
| Comp. Ex. 4 | 0.23 | 230 | 1.28 | 0.27 | 180 | 0.20 | 3.1 | 4.8 | 2.16 | 69.7 |
| Comp. Ex. 5 | 0.25 | 200 | 1.11 | 0.28 | 180 | 0.66 | 1.1 | 3.2 | 0.58 | 52.7 |

TABLE 4

| | Hollow Foam Molding | |
|---|---|---|
| | $J_{eo}$ (×10⁻³ Pa⁻¹) | Swell Ratio $S_w$ |
| Example 1 | 1.48 | 2.1 |
| Example 2 | 1.48 | 2.1 |
| Example 3 | 1.29 | 1.6 |
| Example 4 | 1.29 | 1.6 |
| Example 5 | 1.05 | 1.5 |
| Example 6 | 0.90 | 1.4 |
| Comp. Ex. 1 | 2.39 | 2.7 |
| Comp. Ex. 2 | 2.39 | 2.7 |
| Comp. Ex. 3 | 1.69 | 2.6 |
| Comp. Ex. 4 | 1.48 | 2.1 |
| Comp. Ex. 5 | 0.34 | 1.2 |

As will be appreciated from the results shown in Table 3, light weight hollow moldings having thin, uniform wall thickness may be obtained in Examples 1 to 6 according to the method of the present invention. In Comparative Example 1, in which the polypropylene resin used has large $J_{eo}$ and large swell ratio $S_w$, the wall thickness of the hollow foam molding is large and is not uniform. In this case, even when the amount of the blowing agent is decreased to increase the apparent density of the foam molding to about 0.5 g/cm³, the wall thickness of the hollow foam molding is not sufficiently reduced and the variation of the wall thickness is still large. In Comparative Example 2 in which die clearance is reduced to obtain thin-walled molding, the parison considerably corrugated and, therefore, the foam molding has a great difference between the maximum and minimum wall thicknesses. In Comparative Example 3 in which the polypropylene resin has a small $J_{eo}$ and a large swell ratio $S_w$, the wall thickness of the hollow foam molding is not uniform. In Comparative Example 4 in which the blowing agent is used in a large amount, the apparent density of the foam layer is so small that the wall thickness of the hollow foam molding is not uniform. In Comparative Example 5 in which the polypropylene resin has an excessively small $J_{eo}$ and a small swell ratio $S_w$, the foamability is poor and the wall thickness of the hollow foam molding is not uniform. Further, though the wall is thin, the apparent density is great since the amount of the blowing agent cannot be increased.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method for producing a tubular hollow foam molding having an average wall thickness of 1.0 to 3.0 mm and a thickness variation coefficient $C_v$ of 50% or less, said method comprising the steps of:
    (a) extruding a foamable melt comprising a polypropylene resin and a physical blowing agent through a die to obtain a tubular parison having a softened polypropylene resin foam layer, said polypropylene resin foam layer having throughout an equilibrium compliance $J_{eo}$ of $0.5 \times 10^{-3}$ to $1.8 \times 10^{-3}$ $Pa^{-1}$ and a swell ratio $S_w$ of 2.5 or less;

(b) placing said tubular parison in a mold; and (c) blowing a gas into said tubular parison to blow mold said tubular parison, thereby obtaining the tubular hollow foam molding having a hardened polypropylene resin foam layer with an apparent density of 0.35 to 0.65 g/cm3, wherein said physical blowing agent is used in an amount of 0.01 to 1.2 mols per 1 kg of said polypropylene resin.

2. A method as claimed in claim 1, wherein said physical blowing agent comprises 50 to 100 mole % of carbon dioxide.

3. A method as claimed in claim 1, further comprising, before step (b), blowing a gas into said parison to widen said parison so that the maximum width of said widened parison in the direction perpendicular to the extrusion direction is 0.7 to 1.5 times the maximum width of said hollow foam molding in the direction perpendicular to the extrusion direction.

4. A method as claimed in claim 1, further comprising, during step (a), laminating a non-foamed thermoplastic resin layer on at least one of opposing surfaces of said polypropylene resin foam layer so that said parison has a multi-layered structure having the non-foamed thermoplastic resin layer laminated on at least one of the opposing surfaces of said polypropylene resin foam layer.

5. A method as claimed in claim 1 wherein the average wall thickness is 1.0 to 3.0 mm.

6. A method as claimed in claim 1 wherein the average wall thickness is 1.5 to 2.5 mm.

7. A method as claimed in claim 1 wherein the polypropylene resin is selected from the group consisting of:

(A) propylene homopolymers;
(B) propylene copolymers;
(C) blends of one or more propylene homopolymers and/or copolymers;
(D) blends of one or more propylene homopolymers and/or copolymers with one or more additional polymers other than a polypropylene homopolymer or copolymer.

* * * * *